United States Patent
Taguchi et al.

(10) Patent No.: US 6,403,756 B1
(45) Date of Patent: Jun. 11, 2002

(54) BIODEGRADABLE HIGH MOLECULAR WEIGHT POLYESTER AND METHOD OF PREPARING SAME

(75) Inventors: Yoichi Taguchi, Tsuchiura; Akihiro Oishi, Tsukuba; Yoshikazu Ikeda, Tokyo; Ken-ichi Fujita, Tsukuba; Takashi Masuda, Abiko, all of (JP)

(73) Assignee: National Institute of Advanced Industrial Science and Technology (JP)

( * ) Notice: Subject to any disclaimer, the term of this patent is extended or adjusted under 35 U.S.C. 154(b) by 0 days.

(21) Appl. No.: 09/981,758

(22) Filed: Oct. 19, 2001

(51) Int. Cl.7 .............................................. C08G 63/66
(52) U.S. Cl. ........................ 528/301; 528/272; 528/300; 528/307
(58) Field of Search ................................. 528/272, 300, 528/301, 307

(56) References Cited

FOREIGN PATENT DOCUMENTS

| JP | 09-031176 | 2/1997 |
|---|---|---|
| JP | 09-040762 | 2/1997 |

*Primary Examiner*—Samuel A. Acquah
(74) *Attorney, Agent, or Firm*—Lorusso & Loud

(57) ABSTRACT

Disclosed is a novel, high molecular weight aliphatic polyester having excellent mechanical strengths such as breaking strain and containing a copolymer structure with 3-alkoxy-1,2-propane diol and a method of producing the aliphatic polyester in an industrially advantageous manner. The aliphatic polyester is a biodegradable high molecular weight aliphatic polyester having an ester structure derived from 3-alkoxy-1,2-propane diol.

4 Claims, No Drawings

BIODEGRADABLE HIGH MOLECULAR WEIGHT POLYESTER AND METHOD OF PREPARING SAME

BACKGROUND OF THE INVENTION

This invention relates to a high molecular weight aliphatic polyester having a novel copolymer structure and a method of preparing same.

Synthetic polymers such as polyolefins and aromatic polyesters are now used in a large amount as raw materials indispensable to daily life. These polymers, which are not decomposable in natural environment, causes environmental problems as an increase of consumption thereof.

In this circumstance, biodegradable plastics are now being developed. Among biodegradable polymers, aliphatic polyesters are attractive. In particular, much attention has been paid on polybutylene succinate produced from butane diol and succinic acid or a derivative thereof, because of their high mechanical strengths and melting point. (JP-A-H05-70566, JP-A-H09-12691, JP-A-H09-13259, etc.)

Since polybutylene succinate by itself does not necessarily provide practically sufficient mechanical strengths and processability, studies are being made to improve the properties thereof by copolymerization with various polyvalent alcohols or hydroxyacids. (JP-A-H09-31176, JP-A-H09-40762)

With these proposals, however, the mechanical strengths, especially, breaking strain, are still not fully improved.

It is an object of the present invention to provide a novel biodegradable high molecular weight aliphatic polyester which has good mechanical strengths, especially breaking strain, and good processability and to provide a method which can produce biodegradable high molecular weight aliphatic polyester in a industrially advantageous manner.

SUMMARY OF THE INVENTION

According to the present invention there is provided a biodegradable high molecular weight aliphatic polyester comprising an ester section A represented by the following formula (1):

$$(-CO-R^1-CO-O-R^2-O-)_p \quad (1)$$

wherein $R^1$ represents a divalent aliphatic group having 1–12 carbon atoms, $R^2$ represents a divalent aliphatic group having 2–12 carbon atoms and p is a molar fraction of the polyester fraction of the formula (1) contained in the polyester, and an ester section B represented by the following formula (2):

$$(-CO-R^1-CO-O-CH_2-\underset{\underset{CH_2-OR^3}{|}}{CH}-O-)_r \quad (2)$$

wherein $R^1$ represents a divalent aliphatic group having 1–12 carbon atoms, $R^3$ represents an aliphatic group having 1–18 carbon atoms and r is a molar fraction of the polyester fraction of the formula (2) contained in the polyester, the molar fraction r of said ester fraction B being in the range of 0.001–0.10.

The present invention also provides a biodegradable high molecular weight aliphatic polyester comprising a product obtained by condensation of an aliphatic dicarboxylic acid diester of the following formula (3):

$$R^4O-CO-R^1-CO-OR^5 \quad (3)$$

wherein $R^1$ represents a divalent aliphatic group having 1–12 carbon atoms and $R^4$ and $R^5$ each represent an alkyl group having 1–4 carbon atoms, with an aliphatic glycol of the following formula (4)

$$HO-R^2-OH \quad (4)$$

wherein $R^2$ represents a divalent aliphatic group having 2–12 carbon atoms, and with 3-alkoxy-1,2-propane diol of the following formula (5):

$$HO-CH_2-\underset{\underset{CH_2-OR^3}{|}}{CH}-OH \quad (5)$$

wherein $R^3$ represents an aliphatic group having 1–18 carbon atoms, the amount of the 3-alkoxy-1,2-propane diol being 0.001–0.10 mole per mole of said aliphatic dicarboxylic acid diester.

The present invention further provides a method of preparing a biodegradable high molecular weight aliphatic polyester, comprising reacting an aliphatic dicarboxylic diester of the following formula (3):

$$R^4O-CO-R^1-CO-OR^5 \quad (3)$$

wherein $R^1$ represents a divalent aliphatic group having 1–12 carbon atoms and $R^4$ and $R^5$ each represent an alkyl group having 1–4 carbon atoms, with an aliphatic glycol of the following formula (4)

$$HO-R^2-OH \quad (4)$$

wherein $R^2$ represents a divalent aliphatic group having 2–12 carbon atoms, and with 3-alkoxy-1,2-propane diol of the following formula (5):

$$HO-CH_2-\underset{\underset{CH_2-OR^3}{|}}{CH}-OH \quad (5)$$

wherein $R^3$ represents an aliphatic group having 1–18 carbon atoms, the amount of the 3-alkoxy-1,2-propane diol being 0.001–0.10 mole per mole of said aliphatic dicarboxylic acid diester.

Other objects, features and advantages of the present invention will become apparent from the detailed description of the preferred embodiments of the invention to follow.

DETAILED DESCRIPTION OF THE PREFERRED EMBODIMENTS OF THE INVENTION

The biodegradable high molecular weight aliphatic polyester according to the present invention comprises an ester section A represented by the above formula (1) and an ester section B represented by the above formula (2).

In the above formula (1) representing the ester section A, $R^1$ represents a linear or cyclic divalent aliphatic group having 1–12 carbon atoms, preferably 2–6 carbon atoms. Such a divalent aliphatic group may be an alkylene, such as methylene, ethylene, propylene, butylene, hexylene, octylene, dodecylene, cyclohexylene and cyclohesanedimethylene.

The symbol $R^2$ represents a linear or cyclic divalent aliphatic group having 2–12 carbon atoms, preferably 2–6 carbon atoms. Such a divalent aliphatic group may be an alkylene group such as methylene, ethylene, propylene, butylene, hexylene, octylene, dodecylene, cyclohexylene and cyclohexanedimethylene.

In the formula (2), $R^3$ represents a linear or cyclic aliphatic group and $R^1$ has the same meaning as above. The aliphatic group $R^3$ has 1–18 carbon atoms. Examples of such aliphatic groups include alkyl groups and alkenyl groups, such as methyl, ethyl, propyl, butyl, hexyl, octyl, nonyl, decyl, dodecyl, octadecyl, lauryl, stearyl, behenyl, dodecenyl, cyclohexylene and cyclohexanedimethylene.

The amount of the ester section B in the polyester (molar fraction r) is 0.001–0.10, preferably 0.002–0.03. When the amount of the second ester section B is excessively great, the degree of polymerization of the polymer obtained is not large so that the polymer becomes brittle. On the other hand, too small an amount of the ester section B causes problems that the breaking strain of the polyester is small and the physical properties are similar to those of the homopolymer.

The high molecular weight aliphatic polyester according to the present invention may be produced by various methods. One preferred method includes condensing a divalent aliphatic dicarboxylic acid diester of the following formula (3) with an aliphatic glycol of the formula (4) and with a 3-alkoxy-1,2-propane diol of the formula (5).

The aliphatic dicarboxylic acid diester of the formula (3) may be a diester (such as dimethyl ester, diethyl ester, dipropyl ester or dibutyl ester) of an aliphatic dicarboxylic acid such as succinic acid, adipic acid, suberic acid, sebacic acid or dodecanedicarboxylic acid.

The aliphatic glycol of the formula (4) may be ethylene glycol, propylene glycol, 1,4-butanediol, 1,6-hexanediol, 1,4-cyclohexanedimethanol, polyethylene glycol or polypropylene glycol. The aliphatic glycol is generally used in an amount of 0.90–1.10 moles, preferably 0.95–1.05 moles, per mole of the aliphatic dicarboxylic acid diester.

The 3-alkoxy-1,2-propane diol of the formula (5) may be obtained by, for example, reacting glycerin with an alcohol. The alcohol may be a saturated or unsaturated alcohol having an aliphatic group having 1–18 carbon atoms. Illustrative of suitable alcohols are methanol, ethanol, propanol, butanol, octanol, nonyl alcohol, lauryl alcohol, pentadecyl alcohol, cetyl alcohol, heptadecyl alcohol, stearyl alcohol, allyl alcohol, crotyl alcohol, cyclopentanol and cyclohexanol. The 3-alkoxy-1,2-propane diol is used in an amount sufficient to give a polymer having a molecular weight of at least 10,000 and is, generally, 0.001–0.10 moles, preferably 0.005–0.05 mole, per mole of the aliphatic dicarboxylic acid diester. An amount of the 3-alkoxy-1,2-propane diol more than the above range is not preferable because the degree of the polymerization of the polymer (polycondensation product) is not large and the polymer becomes brittle.

The condensation reaction is preferably carried out in the presence of a conventional ester exchange catalyst.

The reaction is generally performed at a temperature so that the hydroxyl compounds derived from the aliphatic dicarboxylic acid diester and produced as by-products can exist as a gas in the reaction system. When $R^4$ OH and $R^5$ OH by-products are each methanol, for example, the reaction is generally performed at 100–300° C., preferably 120–250° C. The reaction pressure is generally under a reduced pressure, an ambient pressure or a slightly pressurized condition (0.5 kg/cm$^2$G or less). An ambient pressure or a reduced pressure is preferably adopted. It is preferred that the reaction be performed using a reactor equipped with a distillation tower (reaction distillation tower) for removing the hydroxyl compounds produced as by-products from the reactor as quickly as possible.

The reaction is preferably carried out in two steps of a preliminary condensation step (first step) and a molecular weight increasing step (second step). In the preliminary condensation step, low molecular weight condensation products having a terminus to which the aliphatic glycol has been bonded are produced. The condensation product has a number average molecular weight of 500–10,000, preferably 1,000–5,000 The molecular weight can be suitably controlled by the reaction conditions and reaction time. The reaction conditions are such that the hydroxyl compounds produced as by-products can exist as gas.

In the molecular weight increasing step, the low molecular weight condensation products are further condensed while eliminating the aliphatic glycol bonded at their termini to form a high molecular weight condensation product. This step can yield a condensation product having a number average molecular weight of at least 10,000. The reaction conditions may be such that the aliphatic glycol produced as by-products can exist as a gas. The molecular weight increasing step may be carried out using the same reactor as used in the preliminary condensation step or a polymerization apparatus having good stirring efficiency. When the same reactor is used, the reaction conditions are changed, after completion of the preliminary condensation step, for example, by increasing the reaction temperature and reducing the reaction pressure, to perform the condensation of the preliminary condensation products.

The high molecular weight polyester of the present invention has a number average molecular weight of at least 10,000, preferably at least 30,000. The upper limit of the number average molecular weight is generally about 1,000,000.

The high molecular weight polyester of the present invention has a copolymer structure derived from the monoacylated glycerin of the formula (2). As a result of the addition of a small amount of the 3-alkoxy-1,2-propane diol, the mechanical strengths (especially breaking strain) and the processability of the polyester are improved. Further, the polyester has biodegradability.

EXAMPLE

The present invention will be described in detail by the following examples. Various physical properties of the aliphatic polyester are measured by the following methods.

Molecular Weight and Molecular Weight Distribution

The number average molecular weight (Mn), the weight average molecular weight (Mw) and the molecular weight distribution (Mw/Mn) are measured by gel permeation chromatography (GPC) using polystyrene as standard and chloroform as an elution liquid.

Thermal Properties

The melting point and the glass transition point are measured by differential scanning calorimetry (DSC). The thermal decomposition temperature is measured by thermogravimetry (TG).

Mechanical Strengths

A tensile strength tester is used.

Example 1

Into a 100 ml glass reactor equipped with stirring blades, 26.31 g (0.180 mole) of dimethyl succinate, 16.70 g (0.185 mole) of 1,4-butanediol, 0.211 g (1.99 mmol) of 3-methoxy-1,2-propane diol and 20 μl (0.1 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 0.2 mmHg was reached after 30 minutes. The reaction was continued for 3 hours, thereby obtaining a light brown polymer having Mn of 62,500, Mw of 128,000, Mw/Mn of 2.05 and a melting point of 115.3° C. The temperature at which the weight of the polymer had been reduced by 2% by weight was 310° C. The amount of 3-methoxy-1,2-propane diol contained in the polymer is 1.1 moles per 100 moles of the aliphatic dicarboxylic acid component contained in the polymer. The measurement of the mechanical strengths revealed that the modulus was 500 MPa, the upper yield stress was 22.9 MPa, the rupture stress was 59.5 MPa and the breaking strain was 303%.

Comparative Example 1

Into a 100 ml glass reactor equipped with stirring blades, 26.34 g (0.180 mole) of dimethyl succinate, 16.90 g (0.188 mole) of 1,4-butanediol and 18 μl (0.09 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 1 mmHg was reached after 30 minutes. The reaction was continued for 7 hours, thereby obtaining a milky white polymer having Mn of 32,400, Mw of 52,800, Mw/Mn of 1.63 and a melting point of 114.1° C. The measurement of the mechanical strengths revealed that the modulus was 459 MPa, the upper yield stress was 26.0 MPa, the rupture stress was 23.1 MPa and the breaking strain was 119%.

Example 2

Into a 100 ml glass reactor equipped with stirring blades, 26.32 g (0.180 mole) of dimethyl succinate, 16.61 g (0.185 mole) of 1,4-butanediol, 0.390 g (3.67 mmol) of 3-methoxy-1,2-propane diol and 20 μl (0.1 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 0.3 mmHg was reached after 30 minutes. The reaction was continued for 5 hours, thereby obtaining a light brown polymer having Mn of 49,200, Mw of 78,500, Mw/Mn of 1.60 and a melting point of 113.7° C. The temperature at which the weight of the polymer had been reduced by 2 % by weight was 300° C. The amount of 3-methoxy-1,2-propane diol contained in the polymer is 2.0 moles per 100 moles of the aliphatic dicarboxylic acid component contained in the polymer. The measurement of the mechanical strengths revealed that the modulus was 317 MPa, the upper yield stress was 26.4 MPa, the rupture stress was 27.3 MPa and the breaking strain was 372%

Example 3

Into a 100 ml glass reactor equipped with a stirrer, 26.34 g (0.180 mole) of dimethyl succinate, 16.84 g (0.187 mole) of 1,4-butanediol, 0.111 g (0.840 mmol) of 3-allyloxy-1,2-propane diol and 20 μl (0.1 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 0.1 mmHg was reached after 30 minutes. The reaction was continued for 5 hours, thereby obtaining a light brown polymer having Mn of 71,300, Mw of 155,000, Mw/Mn of 2.17 and a melting point of 114.1° C. The temperature at which the weight of the polymer had been reduced by 2% by weight was 314° C. The amount of 3-allyloxy-1,2-propane diol contained in the polymer is 0.47 mole per 100 moles of the aliphatic dicarboxylic acid component contained in the polymer. The measurement of the mechanical strengths revealed that the modulus was 274 MPa, the upper yield stress was 26.3 MPa, the rupture stress was 34.3 MPa and the breaking strain was 324%.

Example 4

Into a 100 ml glass reactor equipped with a stirrer, 26.35 g (0.180 mole) of dimethyl succinate, 16.78 g (0.186 mole) of 1,4-butanediol, 0.443 g (3.60 mmol) of 3-allyloxy-1,2-propane diol and 20 μl (0.1 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 0.3 mmHg was reached after 30 minutes. The reaction was continued for 5 hours, thereby obtaining a light brown polymer having Mn of 63,500, Mw of 133,800, Mw/Mn of 2.11 and a melting point of 114.1° C. The temperature at which the weight of the polymer had been reduced by 2% by weight was 304° C. The amount of 3-allyloxy-1,2-propane diol contained in the polymer is 2.0 moles per 100 moles of the aliphatic dicarboxylic acid component contained in the polymer. The measurement of the mechanical strengths revealed that the modulus was 309 MPa, the upper yield stress was 27.3 MPa, the rupture stress was 32.7 MPa and the breaking strain was 305%.

Example 5

Into a 100 ml glass reactor equipped with a stirrer, 26.32 g (0.180 mole) of dimethyl succinate, 16.83 g (0.187 mole) of 1,4-butanediol, 0.187 g (0.541 mmol) of batyl alcohol (3-octadecyl-1,2-propane diol) and 20 μl (0.1 mmol) of titanium tetraisopropoxide were charged. The mixture was reacted at 160° C. in a nitrogen atmosphere, while removing, by distillation, methanol. After 1 hour reaction, the reaction temperature was increased to 180° C. After 30 minutes, the reaction was further increased 200° C. After another 30 minutes, the reaction temperature was increased to 215° C. and the reaction pressure was gradually reduced. AS a result, vacuum of 0.1 mmHg was reached after 30 minutes. The reaction was continued for 3 hours, thereby obtaining a light brown polymer having Mn of 68,900, Mw of 113,400 and Mw/Mn of 1.65° C. The amount of batyl alcohol contained in the polymer is 0.3 mole per 100 moles of the aliphatic dicarboxylic acid component contained in the polymer. The measurement of the mechanical strengths revealed that the modulus was 277 MPa, the upper yield stress was 24.7 MPa, the rupture stress was 40.3 MPa and the breaking strain was 470%.

The high molecular weight aliphatic polyester according to the present invention has a copolymer structure with 3-alkoxy-1,2-propane diol. Addition of a small content of 3-alkoxy-1,2-propane diol gives greatly improved mechanical strengths such as breaking strain. Further, the addition of a small content of 3-alkoxy-1,2-propane diol is effective in increasing the molecular weight and permits the yield of copolymer having a number average molecular weight of at least 60,000. The high molecular weight aliphatic polyester is biodegradable in nature attributed to the aliphatic ester linkages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A biodegradable high molecular weight aliphatic polyester comprising an ester section A represented by the following formula (1):

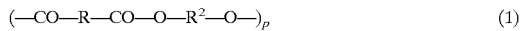
(—CO—R—CO—O—R²—O—)$_p$     (1)

wherein $R^1$ represents a divalent aliphatic group having 1–12 carbon atoms, $R^2$ represents a divalent aliphatic group having 2–12 carbon atoms and p is a molar fraction of the polyester fraction of the formula (1) contained in the polyester, and an ester section B represented by the following formula (2):

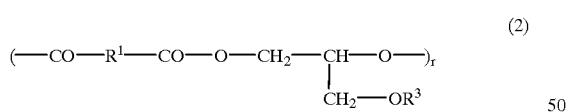

wherein $R^1$ represents a divalent aliphatic group having 1–12 carbon atoms, $R^3$ represents an aliphatic group having 1–18 carbon atoms and r is a molar fraction of the polyester fraction of the formula (2) contained in the polyester, the molar fraction r of said ester fraction B being in the range of 0.001–0.10.

2. A biodegradable high molecular weight aliphatic polyester as recited in claim 1, wherein $R^1$ represents $(CH_2)_2$ and $R^2$ represents $(CH_2)_4$.

3. A biodegradable high molecular weight aliphatic polyester comprising a product obtained by condensation of an aliphatic dicarboxylic acid diester of the following formula (3):

$R^4O—CO—R^1—CO—OR^5$     (3)

wherein $R^1$ represents a divalent aliphatic group having 1–12 carbon atoms and $R^4$ and $R^5$ each represent an alkyl group having 1–4 carbon atoms, with an aliphatic glycol of the following formula (4)

$HO—R^2—OH$     (4)

wherein $R^2$ represents a divalent aliphatic group having 2–12 carbon atoms, and with 3-alkoxy-1,2-propane diol of the following formula (5):

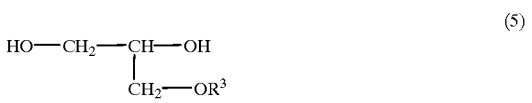

wherein $R^3$ represents an aliphatic group having 1–18 carbon atoms, the amount of the 3-alkoxy-1,2-propane diol being 0.001–0.10 mole per mole of said aliphatic dicarboxylic acid diester.

4. A method of preparing a biodegradable high molecular weight aliphatic polyester, comprising reacting an aliphatic dicarboxylic diester of the following formula (3):

$R^4O—CO—R^1—CO—OR^5$     (3)

wherein $R^1$ represents a divalent aliphatic group having 1–12 carbon atoms and $R^4$ and $R^5$ each represent an alkyl group having 1–4 carbon atoms, with an aliphatic glycol of the following formula (4)

$HO—R^2—OH$     (4)

wherein $R^2$ represents a divalent aliphatic group having 2–12 carbon atoms, and with 3-alkoxy-1,2-propane diol of the following formula (5):

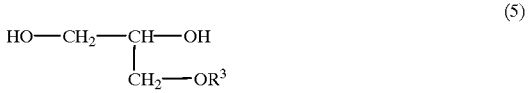

wherein $R^3$ represents an aliphatic group having 1–18 carbon atoms, the amount of the 3-alkoxy-1,2-propane diol being 0.001–0.10 mole per mole of said aliphatic dicarboxylic acid diester.

* * * * *